US011853687B2

(12) United States Patent
Khlystik et al.

(10) Patent No.: US 11,853,687 B2
(45) Date of Patent: Dec. 26, 2023

(54) AUTOMATIC PREDICTION OF IMPORTANT CONTENT

(71) Applicant: Grammarly, Inc., San Francisco, CA (US)

(72) Inventors: Roman Khlystik, San Francisco, CA (US); Karun Singh, San Francisco, CA (US); Dimitrios Alikaniotis, Attica (GR); Jonathan Vandamme, North Vancouver (CA)

(73) Assignee: Grammarly, Inc., San Francisco, CA (US)

( * ) Notice: Subject to any disclaimer, the term of this patent is extended or adjusted under 35 U.S.C. 154(b) by 196 days.

(21) Appl. No.: 17/462,645

(22) Filed: Aug. 31, 2021

(65) Prior Publication Data
US 2023/0066796 A1    Mar. 2, 2023

(51) Int. Cl.
*G06F 9/451*      (2018.01)
*G06F 40/284*    (2020.01)
*G06F 40/166*    (2020.01)
*G06F 40/40*      (2020.01)

(52) U.S. Cl.
CPC ............ *G06F 40/166* (2020.01); *G06F 9/453* (2018.02); *G06F 40/284* (2020.01); *G06F 40/40* (2020.01)

(58) Field of Classification Search
CPC ...... G06F 40/166; G06F 9/453; G06F 40/284; G06F 40/40; G06F 40/30
USPC .......................................................... 704/9
See application file for complete search history.

(56) References Cited

U.S. PATENT DOCUMENTS

| | | |
|---|---|---|
| 9,047,283 B1 | 6/2015 | Zhang |
| 2003/0020749 A1 | 1/2003 | Abu-Hakima et al. |
| 2007/0250504 A1 | 10/2007 | Chen et al. |
| 2011/0301941 A1 | 12/2011 | De Vocht |

(Continued)

FOREIGN PATENT DOCUMENTS

WO    2019236259 A1    12/2019

OTHER PUBLICATIONS

International Searching Authority, International Search Report and Written Opinion for International application No. PCT/US2022/042008, dated Jan. 4, 2023, 10 pages.

(Continued)

*Primary Examiner* — Thierry L Pham
(74) *Attorney, Agent, or Firm* — Baker Botts L.L.P.

(57) ABSTRACT

In an embodiment, a programmed computer system implemented via client-server Software as a Service (SaaS) techniques provides an interactive user interface for identifying specific portions of a digital document susceptible for review and improvement. A server computer may receive a representation of a digital document, such as an email, comprising words arranged into sentences arranged into paragraphs. An embodiment may tokenize a set of all sentences comprising the sequence of sentences into a document-specific vocabulary, then compute a corresponding first and second score for each sentence of the sequence of sentences. The first score may represent a calculated probability of semantic importance of the corresponding sentence to an overall meaning of the digital document. The second score may represent a calculated likelihood that the corresponding sentence will be read by a future reader of the digital document. An embodiment may identify key sentences using the first scores and second scores.

20 Claims, 7 Drawing Sheets

(56) References Cited

U.S. PATENT DOCUMENTS

2018/0129372 A1   5/2018   Ellis et al.
2020/0034481 A1   10/2020  Asplund et al.

OTHER PUBLICATIONS

Olivas et al., "Enhancing hyperheuristics for the knapsack problem through fuzzy logic." Computational Intelligence and Neuroscience, Jan. 25, 2021, retrieved on Nov. 20, 2022 from https://www.hindawi.com/journals/cin/2021/8834324/ 17 pages.

Rankel et al., "A decade of automatic content evaluation of news summaries: Reassessing the state of the art." Proceedings of the 51st annual Meeting of the Association for Computational Linguistics (vol. 2: Short Papers) Aug. 9, 2013, retrieved on Nov. 20, 2022 from https://aclanthology.org/P13-2024.pdf, 6 pages.

New Messages

Prof Layton Dirichlet _405_
Subject _407_ — _406_

Dear Prof. Layton Dirichlet,

As a junior studying computer science, I am very interested in machine summarization, such as your research group investigates. I have already taken classes in NLP, ML (both intro and grad level), and algorithms. I was even the teaching assistant for algorithms. I even was able to combine all of these in a self- project where I built a neural machine translation model capable of going from shakespearean to modern English, which was able to make it all the way to the top of Hacker News. I have a deep interest in the intersection of AI and language -- I even interned at Grammarly last year where I wrote production Lisp! Now I'm considering graduate school in NLP. I am interested in a part-time position in your research group to help decide. <u>Please let me know if such a position is available and if you have any follow-up questions.</u> — _418_

Thanks!
Nai Eve Bayes — _409_

Send ▼

_420_

_414_

_430_  _416_  _419_

← Back

READER'S ATTENTION

Readers might miss _417_
something important

Highlighted areas are what someone is most likely to read.

If your main points are not highlighted, readers might miss them.

SUGGESTIONS — _401_

- Put key information at the top — _402_
- Call out important details in bold
- Avoid long paragraphs — _404_

⊙ Email is concise

▽ Please let me know if such... — _408_

_422_

_428_

AUTOMATIC PREDICTION OF IMPORTANT CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. ©2021 Grammarly, Inc.

TECHNICAL FIELD

One technical field of the present disclosure is computer-implemented artificial intelligence, in the subfield of natural language processing, using models that are programmed to derive semantics such as the importance of a string of text in a digital document to an overall meaning of the digital document. Another technical field is machine learning model development, training, deployment, and operationalization. Another technical field is the incorporation of heuristics into natural language models. Another technical field is automated systems, such as computer-implemented systems for assisting users in improving the readability of electronic communications that the users transmit over a network.

BACKGROUND

In the following description, for the purposes of explanation, numerous specific details are stated to provide a thorough understanding of the present disclosure. It will be apparent, however, that embodiments may be practiced without these specific details. In other instances, well-known structures and devices are shown in block diagram form to avoid unnecessarily obscuring the present disclosure.

Natural language is an incredibly complex phenomenon that may be difficult to accurately model. Nevertheless, since the advent of artificial intelligence (AI), computer-implemented natural language processing (NLP) systems have developed certain capabilities to derive semantic meaning from a text such as a digital document. In particular, machine learning (ML)-based techniques have been developed for deriving semantics such as a classification of a document containing the text, the topics of the text, the meaning of the text or portions thereof, a sentiment of the text or portions thereof, or other semantics. While these derivable semantics are theoretically useful to a drafter of a text for a variety of purposes, such as for improving a clarity of the drafted text, it remains challenging for writers to use ML-derived semantics to actually improve their writing.

Moreover, both writers and readers in today's world may be limited on time. Modern business practices may require individuals to draft dozens of emails and read dozens of emails almost every single day. The proliferation of emails communications pervading all facets of business—and life in general—for many white-collar workers has led to email fatigue and a tendency for busy readers to skim or skip portions of many received emails for the sake of expediency. Regardless of how semantically clear an email is, that email is unlikely to serve as an effective method of communication if the most important points of that email are never even read or are subject to only a cursory examination. If a technical solution could be developed to effectively address the aforementioned issues, then it would represent a significant advance in the state of the art.

BRIEF DESCRIPTION OF THE DRAWINGS

In the drawings:

FIG. 4A depicts an example identification of key sentences in a graphical user interface that might be displayed by a client computing device, in an embodiment.

DETAILED DESCRIPTION

Figure 1:
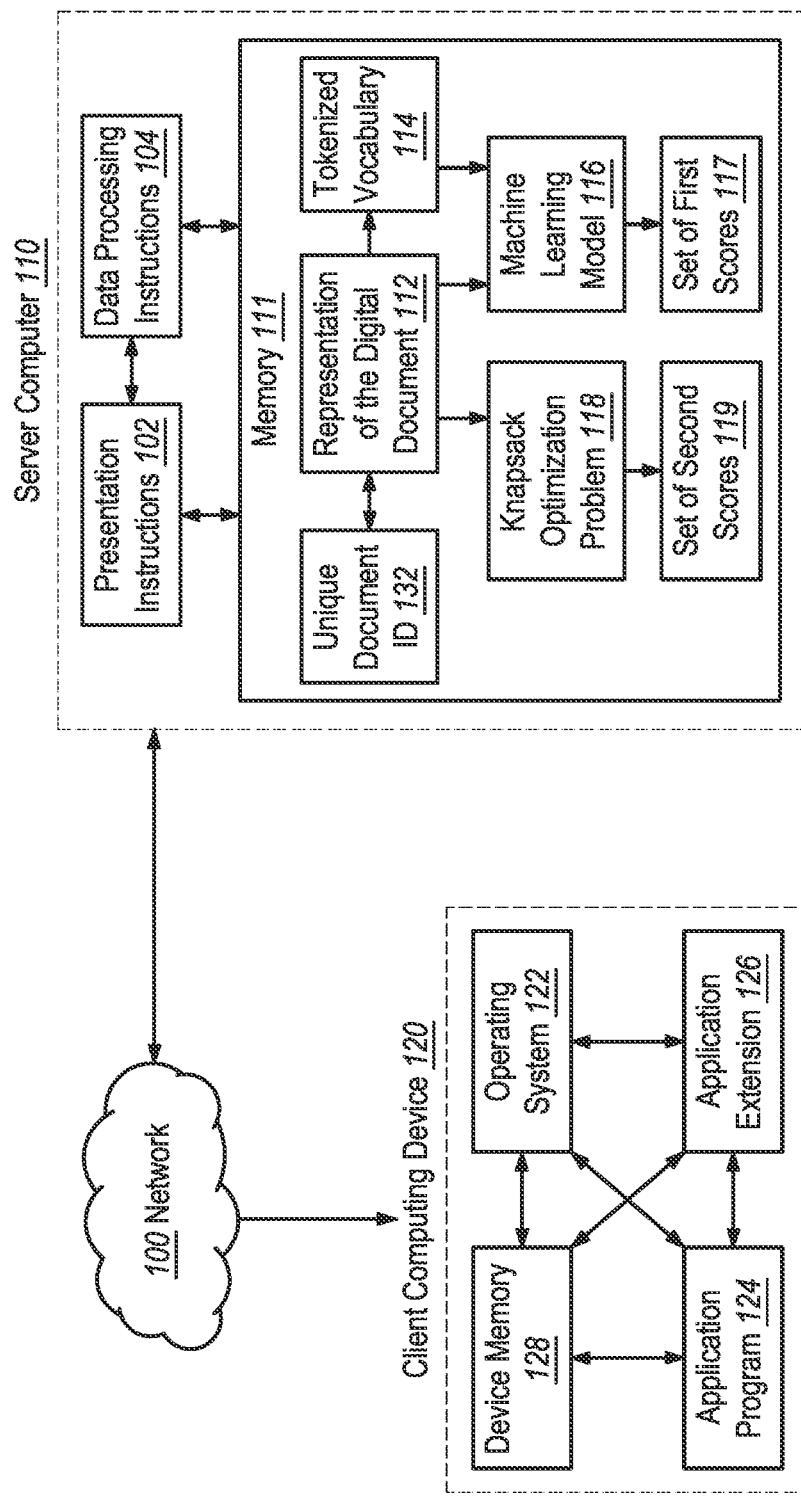
FIG. 1 depicts an example system for automatic prediction of important content.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1.0 General Overview
2.0 Structural & Functional Overview
   2.1 Programmatically Inferring Semantically Important Sentences
   2.2 Programmatically Determining Likely-to-be-Read Sentences
   2.3 Identifying Key Sentences and Presenting Suggestions to a User
   2.4 Example Assistant Process
3.0 Implementation Example—Hardware Overview

\*

1.0 General Overview

In an embodiment, the disclosure provides a programmed computer system implemented via client-server Software as a Service (SaaS) techniques that cause displaying an interactive user interface for identifying specific portions of a digital document susceptible for review and improvement by a writer. Among other things, the present disclosure teaches systems and methods for receiving, from a user of a client computing device, a representation of a digital document and identifying key sentences of the digital document. The digital document, such as an email, may comprise a sequence of sentences arranged into paragraphs, each sentence comprising one or more words. An embodiment may first tokenize a set of all sentences comprising the sequence of sentences into a document-specific vocabulary, then compute a corresponding first and second score for each sentence of the sequence of sentences. The first score may represent a calculated probability of semantic importance of the corresponding sentence to an overall meaning of the digital document, while the second score may represent a calculated likelihood that the corresponding sentence will be read by a future reader of the digital document.

As explained further herein, the first scores may be programmatically inferred using a machine learning algorithm operating on the document-specific tokenized vocabulary, while the second scores may be programmatically determined by constructing and solving a Knapsack optimization problem based on a plurality of heuristics and defined partly by a cost function and a value function.

In embodiments, by identifying key sentences that are important to an overall meaning of the document, but which are not likely to be read by a future reader of the digital document, the system provides a novel, targeted approach to enhancing the readability of a digital document. The disclosure provides, in part, a method of identifying key takeaways in a digital document that might otherwise be missed by a future reader of the digital document. The disclosure also provides, in part, a technical solution addressing the technical problem of effectively generating and conveying programmatically derived semantics to a writer of a digital document to suggest or implement concrete and actionable points of improvement. In particular embodiments, a system provides a user of a client computing device with an interface element associated with a key sentence that allows for automatic implementation of a suggestion associated with the interface element through selection via a control device.

An example method involves receiving a representation of a digital document at a server computer and electronically storing the representation in memory of the server computer, the digital document including a sequence of sentences arranged into one or more paragraphs, each sentence being made up of one or more words in a natural language.

The method may involve programmatically generating a document-specific vocabulary by tokenizing a set of all sentences comprising the sequence of sentences into a document-specific set of tokens. The method may involve programmatically inferring and outputting, by executing a trained machine learning model to evaluate the document-specific set of tokens, for each sentence of the sequence of sentences, a corresponding first score value representing a probability of that sentence being semantically important to an overall meaning of the digital document. The method may involve programmatically determining, by constructing a digital representation of a Knapsack optimization problem in server computer memory and executing solution instructions to solve the problem based on a plurality of heuristics and defined partly by a cost function and a value function, the functions being programmed as part of the solution instructions, for each sentence of the sequence of sentences, a corresponding second score value representing a likelihood of that sentence being read by a future reader of the digital document. The method may involve transmitting, from the server computer to a client computing device via a network, first display instructions that are formatted to cause identifying one or more key sentences of the sequence of sentences based on each of the corresponding first score and the corresponding second score of each sentence of the sequence of sentences in a graphical user interface of the client computing device.

In an embodiment, the example method involves receiving, from a client computing device that is communicatively coupled to the server computer via a network, a plurality of change messages each comprising a text change to the digital document that is undergoing composition at the client computing device, and forming the representation of the digital document based on the change messages.

In an embodiment, the example method involves transmitting to the client computing device second display instructions that are formatted to cause displaying, in the graphical user interface of the client computing device, one or more suggestion text strings that are associated with at least one of the key sentences.

In an embodiment, the example method involves the second display instructions being formatted to cause displaying the one or more suggestion text strings in the graphical user interface of the client computing device using at least one of an underlining of one or more words of the digital document or a notification in a graphical panel that is displayed separate from the digital document.

In an embodiment, the example method involves the second display instructions being formatted to cause displaying at least one of the one or more suggestion text strings in a checklist in the graphical panel, the method further including transmitting updated second display instructions being formatted to update the checklist in real time in response to input from the client computing device specifying one or more changes to content of the digital document that implement the at least one suggestion.

In an embodiment, the example method involves the second display instructions being formatted to cause displaying the one or more suggestion text strings of the checklist with at least one of a first suggestion text string specifying changing key information to boldface, a second suggestion text string specifying positioning more important information proximal to a first sentence of the sequence of sentences, or a third suggestion text string specifying converting one or more long paragraphs to bulleted lists.

In an embodiment, the example method involves formatting the second display instructions to cause displaying, in the graphical user interface, an interface element that is associated with at least one of the suggestion text strings presented in the checklist, the interface element being configured to automatically modify the content of the digital document to reflect the at least one of the suggestion text strings in response to input from the client computer specifying selecting the interface element via a control device.

In an embodiment, the example method involves formatting the second display instructions to cause displaying at least one of the one or more suggestion text strings using underlining in the digital document at the client computing device, and may further involve formatting the second display instructions to cause displaying a triggered notification text string specifying to initiate assistant instructions that are programmed to facilitate transmission of additional suggestion text strings to the client computing device and transmitting the second display instructions in response to receiving input from the client computing device specifying a control device hovering over a certain sentence of the sequence of sentences that is associated with the underlining.

In an embodiment, the example method involves transmitting to the client computing device third display instructions that are formatted to specify initiating the assistant instructions in response to the server computer detecting, for a particular sentence of the sequence of sentences, that the first score corresponding to the particular sentence is above a first score threshold and that the second score corresponding to the particular sentence is below a second score threshold.

In an embodiment, the example method involves transmitting to the client computing device fourth display instructions that are formatted to cause displaying, in the graphical user interface of the client computing device, a heatmap comprising an overlay of a plurality of levels of highlighting using a color gradient, each sentence of the sequence of sentences being highlighted with a level of highlighting associated with the corresponding second score of that sentence, and the sentences that have been programmatically determined to be more likely to be read being overlayed with a specified first level of highlighting.

In an embodiment, the example method involves dividing the representation of the digital document into segments and transmitting to the client computing device fifth display instructions that are formatted to cause identifying, in the graphical user interface of the client computing device, one or more key sentences for each segment.

In an embodiment, the example method involves automatically executing the method in one or more second iterations, each of the second iterations executing responsive to the server computer detecting a triggering event.

In an embodiment, the example method involves the triggering event being that the server computer determining that a predetermined period has elapsed after executing a previous iteration of the method, or the server computer determining that the client computing device has transmitted a particular number of words added to the digital document.

In an embodiment, the example method involves a heuristic associated with the cost function being a first function of a sentence length of a particular sentence of the sequence of sentences, and one or more heuristics associated with the value function being at least one of a second function of the sentence length of the particular sentence, a function of the position of the particular sentence within the sequence of sentences, a function of the complexity of each word of a set of words comprising the particular sentence, and a function of a frequency of each word of the set of words comprising the particular sentence with respect to a set of all words comprising the digital document.

In an embodiment, the example method involves a set of features of the trained machine learning model including at least one of a function of a sentence length of a particular sentence, a function of the particular sentence's position in a corresponding paragraph, a function of the corresponding paragraph's position relative to any other paragraphs of the digital document, a function of proximity of the particular sentence to a nearest of a first sentence or the last sentence of the sequence of sentences, a function of a position of the particular sentence within the corresponding paragraph, or the LexRank of the particular sentence.

2.0 Structural & Functional Overview

FIG. 1 depicts an example system for automatic prediction of important content. FIG. 1, and the other drawing figures and all of the descriptions and claims in this disclosure, are intended to present, disclose and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of automated generation and transmission of programmatically derived semantics to a writer of a digital document. Every step or operation that is functionally described in the disclosure is intended for implementation using programmed instructions that are executed by a computer. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a server computer 110 is communicatively coupled to client computing device 120 over network 100. Network 100 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, the client computing device 120, and other elements of the system may each comprise an interface compatible with the network 100 and are programmed or configured to use standardized protocols for communication across the networks such as TCP/IP, Bluetooth, and higher-layer protocols such as HTTP, TLS, and the like.

The client computing device 120 is a computer that includes hardware capable of communicatively coupling the device to one or more server computers, such as server computer 110, over one or more service provides. For example, the client computing device 120 may include a network card that communicates with server computer 110 through a home or office wireless router (not illustrated in FIG. 1) that is communicatively coupled to an internet service provider. The client computing device 120 may be a smartphone, personal computer, tablet computing device, PDA, laptop, or any other computing device capable of transmitting and receiving information and performing the functions described herein.

The client computing device may comprise device memory 128, operating system 122, application program 124, and application extension 126. In one embodiment, client computing device 120 hosts and executes the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 comprises a conventional internet browser application that is capable of communicating over network 100 to other functional elements via HTTP and capable of rendering dynamic or static HTML, XML, or other markup languages, including displaying text, images, accessing video windows and players, and so forth. In other embodiments, application program 124 may instead be an email client, such as GMAIL or OUTLOOK, which are known commercial embodiments, but it may also be another email client application. In embodiments, server computer 110 may provide an application extension 126 for application program 124 through which the aforementioned communication and other functionality may be implemented.

The server computer 110 may be implemented using a server-class computer or other computer having one or more processor cores, co-processors, or other computers. The server computer 110 may be a physical server computer and/or virtual server instance stored in a data center, such as through cloud computing. In an embodiment, server computer 110 may be implemented using two or more processor cores, clusters, or instances of physical machines or virtual machines, configured in a discrete location or co-located with other elements in a datacenter, shared computing facility, or cloud computing facility.

In FIG. 1, in an embodiment, server computer 110 comprises data processing instructions 104 coupled to both presentation instructions 102 and memory 111. The memory 111 may represent any memory accessible by the server computer 110 including a relational database, a data lake, cloud data storage, local hard drives, computer main memory, or any other form of electronic memory.

The data processing instructions 104 may communicate with the client computing device 120 over the network 100 to cause uploading of a representation of a digital document 112 into memory 111. The digital document represented may be an email, a hypertext markup language (HTML) file, or an electronic text file in a file type useable by a text editor, such as a text file, Rich Text Format (RTF) file, word processor file, or another type of digital document. In embodiments, the representation of the digital document 112 may comprise the digital document itself, with or without attendant metadata. In embodiments, the representation of the digital document 112 may comprise a subset of the information contained within the digital document. For example, if the digital document is an email, then the received representation of that email may contain only data corresponding to the text found in the body of that email comprising a sequence of sentences arranged into one or more paragraphs, each paragraph comprising one or more sentences, and each sentence comprising one or more words. In an embodiment, the data processing instructions 104 causes any representation of a digital document 112 uploaded to the server computer 110 to be associated with a unique document ID 132.

In FIG. 1, in an embodiment, data processing instructions 104 causes a document-specific tokenized vocabulary 114 comprising a set of document-specific tokens to be created and stored in memory 111 based on the digital document. In an embodiment, when a new version of the digital document is uploaded to the server computer, then the data processing instructions 104 may cause a new corresponding tokenized vocabulary to be created and stored in memory 111. In an embodiment, the data processing instructions 104 may cause a machine learning model 116 associated with the digital document and/or the unique document ID 132 of the digital document to be generated and stored in memory 111 based on document-specific tokens comprising the document-specific tokenized vocabulary 114. The data processing instructions 104 may then cause, for each sentence of the sequence of sentences comprising the digital document, a corresponding set of first scores 117 to be generated and stored in memory 111, using the corresponding machine learning model 116. Each first score of the set of first scores 117 may be respectively associated with a particular sentence of the sequence of sentences. The data processing instructions 104 may also cause a Knapsack optimization problem 118 to be programmatically generated and stored in memory 111, in which the Knapsack optimization problem 118 corresponds to the same representation of the digital document 112 and/or associated unique document ID 132. The data processing instructions 104, may also, for each sentence of the sequence of sentences, solve the corresponding Knapsack optimization problem 118 to produce a set of second scores 119. Each second score of the set of second scores 119 may be respectively associated with a particular sentence of the sequence of sentences. In an embodiment, data processing instructions 104 identifies one or more key sentences of the sequence of sentences based on the set of first scores 117 and the set of second scores 119 and initiates presentation instructions 102 to cause presenting of the one or more key sentences to a user of the client computing device 120.

In FIG. 1, in an embodiment, presentation instructions 102 is coupled to both data processing instructions 104 and memory 111. In an embodiment, presentation instructions 102 causes the presentation of a heatmap corresponding to the set of second scores 119 in a graphical user interface (GUI) to be overlaid on the sequence of sentences of the digital document displayed on a display of client computing device 120. As explained further herein, in embodiments, a heatmap may show the user which sentences of the sequence of sentences have been programmatically calculated to be most likely to be read by a future reader of the digital document. Presentation instructions 102 may initiate processes to facilitate the display of important content identified by the data processing instructions 104 to the user of the client computing device 120. Presentation instructions 102 may cause underlining or bolding of the key sentences in a GUI displayed on a display of client computing device 120. As described further herein, presentation instructions 102 may cause one or more suggestions associated with at least one key sentence to be displayed to the user in a checklist or other form. In embodiments, when a user hovers over a key sentence identified in the GUI using a control device, presentation instructions 102 may provide the user an option to initiate an assistant process that facilitates the display of additional suggestions to the user.

Figure 2:
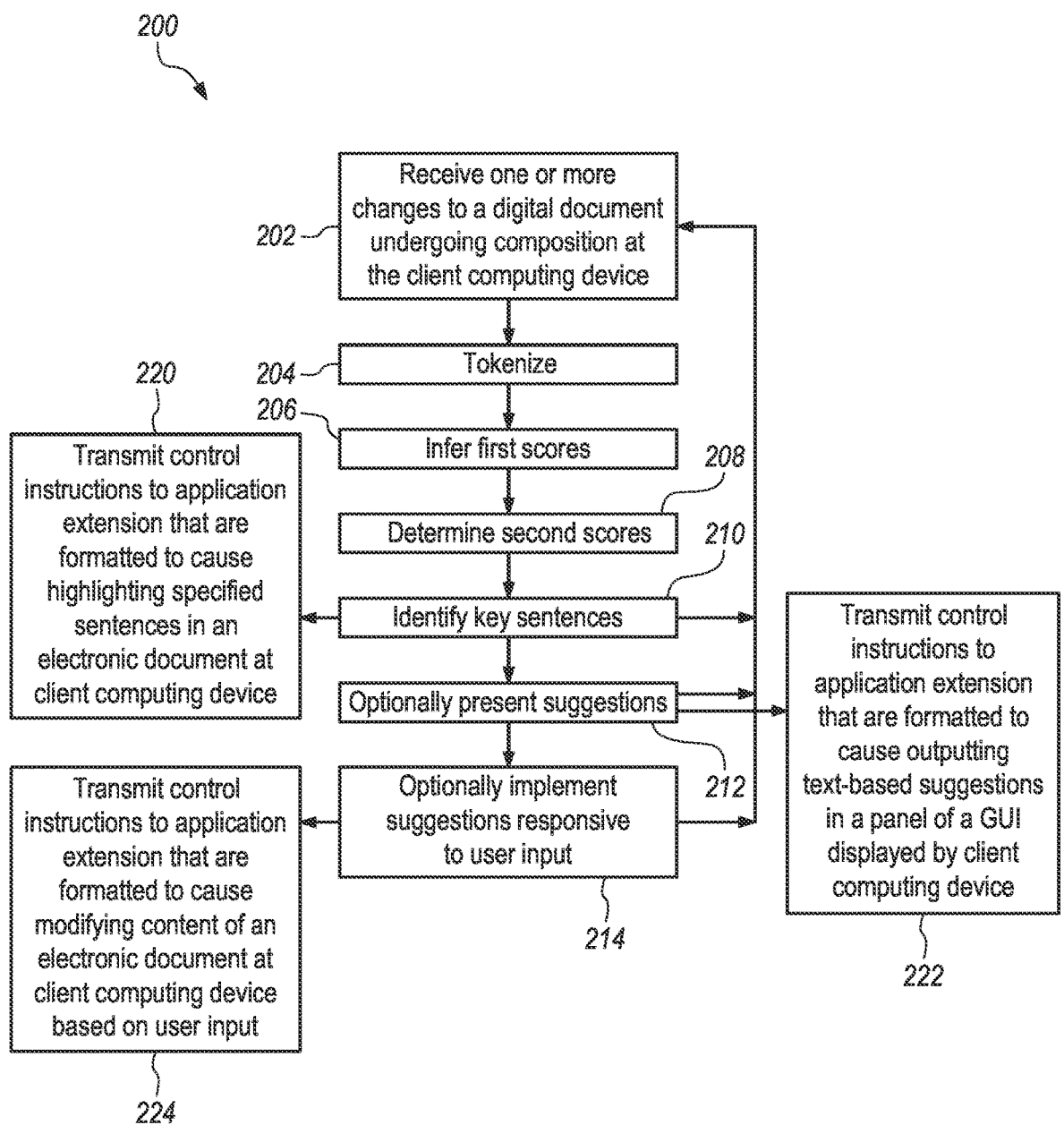
FIG. 2 depicts an example computer-implemented or programmed method for automatic prediction of important content.

FIG. 2 depicts an example computer-implemented or programmed method for automatic prediction of important content. At step 202, in an embodiment, method 200 begins at step 202 with receiving a representation of one or more changes to a digital document undergoing composition at the client computing device. For example, server computer 110 may receive from the client computing device 120, that is communicatively coupled to the server computer 110 via a network 100, a plurality of change messages each comprising a text change to the digital document that is undergoing composition at the client computing device 120. The representation of the digital document 112 may then be formatted based on the change messages.

In embodiments, the digital document represented may be an email, an HTML file, or an electronic text file in a file type useable by a text editor, such as a text file, RTF file, DOC or DOCX file, or another type of digital document. In embodiments, the representation of the digital document 112 may comprise the digital document itself, with or without attendant metadata. In embodiments, the representation of the digital document 112 may comprise a subset of the information contained within the digital document. For example, if the digital document is an email, then the received representation of that email may contain only data corresponding to the text found in the body of that email comprising a sequence of sentences arranged into one or more paragraphs, each paragraph comprising one or more sentences, and each sentence comprising one or more words. The digital document may be received via a user explicitly manually uploading the document to the server computer 110 for processing, or the document may be received automatically, as described further herein, for example through a plurality of change messages.

In FIG. 2, in an embodiment, method 200 is programmed to transition from step 202 to step 204 at which point a document-specific vocabulary is generated by tokenizing a set of all sentences comprising the sequence of sentences into a document-specific set of tokens. In embodiments, the tokenization process may occur after doing sentence splitting by any standard technique including a statistical inference technique (for example, logistic regression in OpenNLP) or a regex-based rules technique (GATE). Other embodiments may instead tokenize first using finite automata and then do sentence splitting.

In particular embodiments, the tokens may be sentences, words, subword units, or other types of tokens. In embodiments, the tokenization may be a word-level tokenization using accomplished using a Python library such as SpaCy, Keras, Genism, or a custom Regex. In embodiments, the tokenization may be a character-level tokenization. In embodiments, the tokenization may be a subword level tokenization implemented by algorithms such as WordPiece, Unigram, a byte pair encoding (BPE), or SentencePiece. In embodiments, the tokenization is a sentence-level tokenization or another type of tokenization.

2.1 Programmatically Inferring Semantically Important Sentences

In FIG. 2, in an embodiment, method 200 is programmed to transition from step 204 to step 206 at which point a machine learning model is run on the document-specific set of tokens to infer, for each sentence of the sequence of sentences, a corresponding first score reflecting a probability of that sentence being semantically important to an overall meaning of the digital document. In embodiments, the machine learning model may be an unsupervised model designed to assess the centrality of the sentences within the digital document. For example, an implementation may use the techniques described in Güneş Erkan et al., "LexRank: Graph-based Lexical Centrality as Salience in Text Summarization," *Journal of Artificial Intelligence Research (JAIR)* (*Volume* 22) (2004), pages 457-479, and the reader of the present disclosure is presumed to understand those techniques. In one embodiment, for each sentence of the sequence of sentences of the digital document, a LexRank score is digitally stored as a first score representing the semantic importance of the corresponding sentence to an overall meaning of the digital documents.

Particular embodiments may use a reinforcement learning algorithm to generate the plurality of first scores, wherein the LexRank of sentences is only one feature of a plurality of features. In an embodiment, a set of features of the trained machine learning model comprises at least one of a function of a sentence length of a particular sentence, a function of the particular sentence's position in a corresponding paragraph, a function of the corresponding paragraph's position relative to any other paragraphs of the digital document, a function of proximity of the particular sentence to a nearest of a first sentence or the last sentence of the sequence of sentences, a function of a position of the particular sentence within the corresponding paragraph, or the LexRank of the particular sentence. The reader of the present disclosure is presumed to understand reinforcement learning techniques that use a plurality of reward parameters and a plurality of constraints to train an unsupervised machine learning model.

Moreover, in one example, an implementation may use the techniques described in Guy Feigenblat et al., "Unsupervised Query-Focused Multi-Document Summarization using the Cross Entropy Method," *SIGIR '17: Proceedings of the* 40th *International ACM SIGIR Conference on Research and Development in Information Retrieval*, pages 961-964, and the reader of the present disclosure is presumed to understand those techniques. In particular embodiments, an unsupervised model can be trained to summarize a document using a Cross-Entropy method combining query-dependent and query-independent features.

Sentences determined to be probable to be semantically "important" to an overall meaning of the digital document may be one or more sentences that are extracted using a programmed implementation of:

$$\text{Let } p_x^{[\mu]}(w) \stackrel{\text{def}}{=} \frac{tf(w, x) + \mu \frac{tf(w, c)}{len(c)}}{len(x) + \mu}$$

in which the mathematical notation denotes a Dirichlet smoothed language model (LM) of text x with parameter μ and C denoting a given background corpus. Besides LexRank and the other features already discussed, embodiments may also use features comprising one or more of the following:

(1) a Bhattacharya similarity coefficient between a unigram LM summary of a query q and a unigram LM of summary $S^1$, $$Q_1(S|q, \mathcal{D}) = \Sigma_{w \in q} \sqrt{p_q^{[0]}(w) \cdot p_s^{[\mu]}(w)},$$

(2) a measure of the relative mass that summary S "devotes" to the query, $$Q_2(S|q, \mathcal{D}) = \Sigma_{w \in q} p_s^{[0]}(w),$$

(3) salience, $$Q_3(S|q, \mathcal{D}) = \frac{\vec{S} \cdot \vec{\mathcal{D}}}{\|\vec{S}\| \|\vec{\mathcal{D}}\|},$$

(4) diversity, $$Q_4(S|q, \mathcal{D}) = -\sigma_{w \in s} q_s^{[0]} \log p_s^{[0]}(w),$$

(5) position, $$Q_5(S|q, \mathcal{D}) = \sqrt[|S|]{\prod_{s \in S} \left(1 + \frac{1}{\log(2 + pos(s))}\right)},$$

or
(6) length, $$Q_6(S|q, \mathcal{D}) = \frac{1}{|S|} \text{len}(S).$$

Other embodiments may not use any of these six specific features.

In an embodiment, first scores are normalized to fall within [0, 1] and a higher corresponding first score indicates that a specific sentence of the sequence of sentences is of greater semantic importance to an overall meaning of the digital document according to, for example, one of the example methodologies described in this section.

2.2 Programmatically Determining Likely-to-be-Read Sentences

In FIG. 2, in an embodiment, method 200 is programmed to transition from step 206 to step 208 at which point, for each sentence of the sequence of sentences, a corresponding second score is programmatically determined, the second score representing a likelihood of that sentence being read by a future reader of the digital document. In embodiments, the plurality of second scores is generated by constructing a digital representation of a Knapsack optimization problem in server computer memory and executing solution instructions to solve the problem based on a plurality of heuristics and defined partly by a cost function and a value function, the functions being programmed as part of the solution instructions.

The Knapsack optimization problem generated in computer memory may comprise a cost function and a value function. The Knapsack problem is a problem of resource optimization. An instance of the problem includes a set of items, each having a cost (weight) and a value. The Knapsack has a total weight limit for the items it holds, which is a primary constraint. A solution to the problem is a combination of items to maximize total value while remaining under the weight limit of the Knapsack.

Embodiments of the disclosed technology model the reading behavior of readers of a digital document in the context of the Knapsack problem. A given digital document may be split into portions, such as sentences, each portion being associated with both a cost and a value. Cost can be thought of as the time and/or effort required to read a certain portion of the digital document (for example, a sentence), while value can be thought of as a reward earned by a reader that consumes the certain portion. But readers are assumed to have a finite attention span (cost budget), therefore a reader may be modeled as selectively attending to content that maximizes value under some constrained cost budget.

Embodiments use the Knapsack optimization problem framework to simulate how readers with varying attention spans (cost budgets) might selectively attend to various portions (for example, sentences) of the digital document. For instance, a reader with a budget of 10 may read sentences 1 and 3, but a reader with a budget of 15 may read sentences 1, 2, and 5. A sentence may be mapped to an attention score based on the budget at which the sentence is modeled as being first attended to by a reader of the digital document. Sentences modeled to be attended to by readers under smaller budgets may thus have higher attention scores, as even rushed readers would tend to read them.

In particular embodiments, a heuristic or feature associated with the cost function may be a first function of a sentence length of a particular sentence of the sequence of sentences, and one or more heuristics associated with the value function may be a second function of the sentence length of the particular sentence, a function of the position of the particular sentence within the sequence of sentences, a function of the complexity of each word of a set of words comprising the particular sentence, and/or a function of a frequency of each word of the set of words comprising the particular sentence with respect to a set of all words comprising the digital document. Another heuristic associated with the value function may be based on the existence of formatting, such as bolding, underlining, italics, or other formatting in the particular sentence of the sequence of sentences.

The server computer 110 may be programmed to solve the Knapsack optimization problem by any method known in the art, including but not limited to dynamic programming, a meet-in-the-middle algorithm, or an approximation algorithm such as a greedy approximation algorithm or a full polynomial time approximation scheme (FPTAS).

Optionally, method 200 involves transmitting, to a client computing device, display instructions that are formatted to cause displaying, in the graphical user interface of the client computing device, a heatmap comprising an overlay of a plurality of levels of highlighting using a color gradient, each sentence of the sequence of sentences being highlighted with a level of highlighting associated with the corresponding second score of that sentence, and the sentences that have been programmatically determined to be more likely to be read being overlayed with a specified first level of highlighting. This first level of highlighting may be a darker level of highlighting within the gradient. Conversely, sentences programmatically determined to be less likely to be read may be, in an embodiment, highlighted in the heatmap with a relatively lighter level of highlighting within the gradient.

In an embodiment, second scores are normalized to fall within [0, 1] and a higher corresponding second score indicates that a specific sentence of the sequence of sentences is more likely to be read by a future reader of the digital document, according to, for example, one of the example methodologies described in this section.

2.3 Identifying Key Sentences and Presenting Suggestions to a User

In FIG. 2, in an embodiment, method 200 progresses from step 208 to step 210 at which point key sentences are identified. The key sentences may represent sentences of the digital document which are both important to an overall semantic meaning of the digital document and unlikely to be read by a future reader of the digital document. The key sentences may be programmatically determined based on the corresponding first score and the corresponding second score of each sentence of the sequence of sentences. For example, each score of the set of first scores 117 and set of second scores 119 may be normalized to the interval [0, 1]. A key sentence may be a sentence where the first score corresponding to that particular sentence is above a first score threshold (for example, 0.3, 0.4, 0.5, 0.6, or 0.7) and that the second score corresponding to that particular sentence is below a second score threshold (for example, 0.3, 0.4, 0.5, 0.6, or 0.7). These thresholds are examples only, and various thresholds can be effectively used based on desired sensitivity and specific applications.

In an embodiment, method 200 progresses from step 210 to step 220 at which point control instructions are transmitted to application extension 126, the control instructions being formatted to cause highlighting specific sentences (one or more key sentences) in an electronic document under composition at the client computing device (the digital document).

FIG. 4A depicts an example identification of key sentences in a graphical user interface that might be displayed by a client computing device 120, in an embodiment. An email composition panel 412 comprises a To: field 405, a subject field 407, email body 414, control button 430, and composition icons 420. An example email is under composition in the email body 414, addressed to a Prof. Layton Dirichlet, an example intended recipient 406, and signed by Nai Eve Bayes, an example sender 409.

While FIG. 4A does not depict a heatmap overlaid on the email body, the heatmap featuring levels of highlighting within a gradient, nonetheless it would be presumed to be present in some embodiments. The shading of those embodiments may be based on the second score corresponding to each sentence of the sequence of sentences comprising the email body 414. For example the text strings "Dear Prof. Layton Dirichlet", "As a junior studying computer science, I am very interested in machine summarization, such as tour research group investigates.", "Thanks!", and "Nai Eve Bayes" might be highlighted a darker color after being detected to be more likely to be read by a future reader of the email, while "I am interested in a part-time position in your research group to help decide." might be highlighted in a lighter color after being detected to be unlikely to be read by a future reader of the email.

An example key sentence 418, as illustrated in FIG. 4A, reads "Please let me know if such a position is available and if you have any follow-up questions." This is a sentence that may have been programmatically determined to be both semantically important to an overall meaning of the email and unlikely to be read, as can be seen by the underlining of the sentence. In embodiments, the control instructions are formatted to cause identifying of one or more key sentences in another way besides underlining the sentence, such as by bolding the sentence, changing a color or a background of the sentence, highlighting the sentence, or by identifying the sentence use a graphical element of displayed in a GUI. For example, as illustrated in FIG. 4A, key sentence identification box 408 identifies the key sentence "Please let me know if such . . .".

Figure 4B:
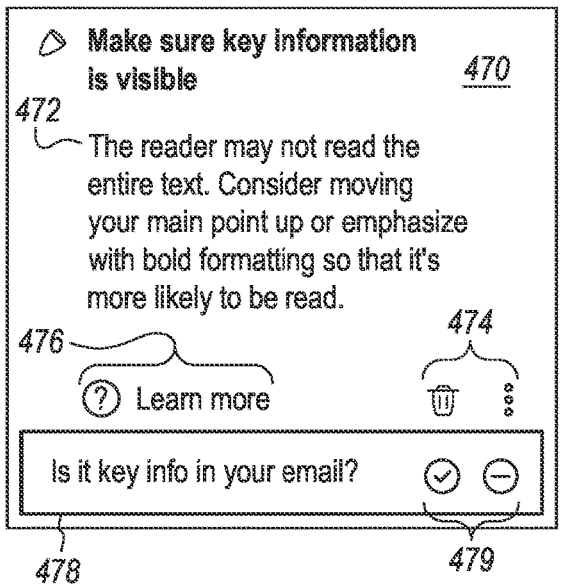
FIG. 4B depicts a buried information card.

FIG. 4B shows an expanded version of key sentence identification box 408 referred to as buried information card 470. In an embodiment, when server computer 110 detects that a user has selected interface element 428 or another particular interface element of panel 416, server computer 110 transmits control instructions to client computing device 120 formatted to cause displaying of buried information card 470 in a GUI provided by application extension 126. In the depicted embodiment, buried information card 470 comprises text-based advice 472, help interface element 476, buried information control icons 474, and key information query box 478 comprising yes/no control buttons 479 configured to facilitate the receipt of feedback by server computer 110 about whether a sentence identified as a key sentence actually contains semantically important information to an overall meaning of the digital document from the perspective of a user of computing device 120. In an embodiment, user feedback received in this manner may be used to develop a training data set for training a machine learning model to infer a set of first scores in a supervised fashion, as opposed to in the unsupervised fashion discussed in greater specificity throughout this disclosure.

Referring again to FIG. 2, after identifying one or key sentences, in an embodiment, method 200 may progress from step 210 back to step 202 at which point one or more additional change messages are received by the server computer 110 and another cycle of key sentence identification may continue. In another embodiment, method 200 may progress from step 210 to step 212 at which point server computer 110 optionally causes the presentation of one or more suggestions associated with one or more of the key sentences. For example, method 200 may proceed to step 222 at which point server computer 110 transmits control instructions to application extension 126 that are formatted to cause outputting text-based suggestions in a panel of a GUI displayed by the client computing device 120.

FIG. 4A depicts an example presentation of text-based suggestions in a panel of a GUI. In this example embodiment, panel 416 comprises display options icons 419, suggestions subpanel 417, suggestions box 401, and key sentence identification box 408. In the depicted embodiment, suggestions subpanel 417 displays explanatory/introductory text 422 that explains the presentation of the set of second scores 119 in the digital document undergoing composition at the client computing device 120 (for example, the email of FIG. 4A). In the embodiment of FIG. 4A, explanatory/introductory text 422 explains that sentences that are more likely to be read (having a higher corresponding second score) will be more heavily highlighted, as might be accomplished using a heatmap that effectuates levels of highlighting with a gradient, as explained with more specificity further herein.

In an embodiment, suggestions box 401 is caused to be presented by server computer 110 by sending to the client computing device 120 control or display instructions being formatted to cause displaying at least one of one or more suggestion text strings in a "to do" checklist 402 displayed within suggestions box 401 displayed in panel 416 and suggestions subpanel 417. In the example visualization of FIG. 4A, the suggestion text strings of the "to do" checklist 402 are the following text strings: "Put key information at the top", "Call out important details in bold", and "Avoid long paragraphs". In embodiments, method 200 may also involve formatting the instructions to update the "to do" checklist 402 in real-time in response to input from the client computing device 120 specifying one or more changes to the content of the digital document that implements the at least one suggestion. As seen in the visualization of FIG. 4A, server computer 110 processed change messages according to the methods described herein and detected that the email undergoing composition was now concise, responsive to which server computer 110 transmitted instructions causing "Email is concise" to be displayed in a "done" checklist 404 displayed within suggestions box 401.

Figure 4C:
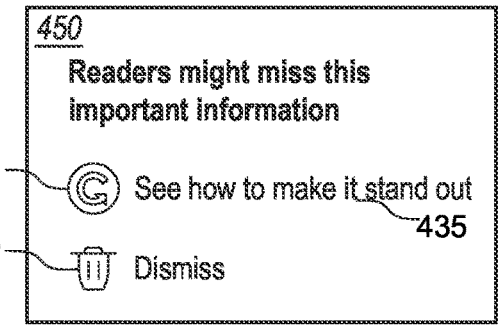
FIG. 4C depicts an example prompt panel comprising a control button.
Figure 4D:
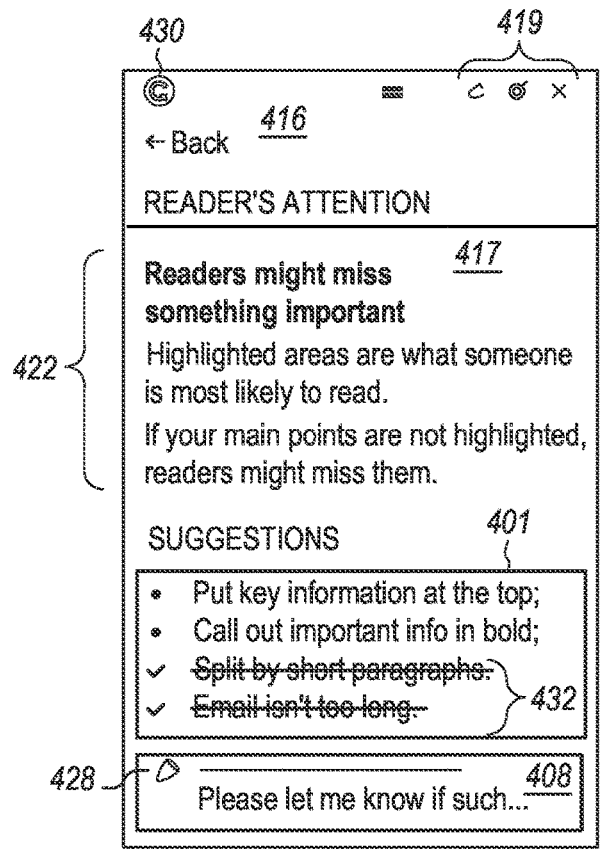
FIG. 4D depicts an example of updating information in a suggestions box.

In an embodiment, FIG. 4D depicts another example of updating information in suggestions box 401 to reflect changes detected in the digital document undergoing composition at client computing device 120 that satisfy the one or more suggestions. In this example embodiment, crossed-out suggestions 432 represent suggestions programmatically detected to have been implemented by the user.

Referring again to FIG. 4A, in an embodiment, key sentence identification box 408 is also displayed within panel 416. As mentioned, key sentence identification box 408 is one method of identifying in a GUI one or more key sentences identified by method 200. Here the key sentence 418 in the email body 414, "Please let me know if such as position is available and if you have any follow-up questions." is both underlined and identified in key sentence identification box 408. Although not depicted in FIG. 4A, other information such as a suggestion corresponding to key sentence 418 might also be displayed in key sentence identification box 408, such as the text string "Put key information at the top", representing one example technique for displaying one or more suggestions corresponding to the one or more key sentences.

Referring again to FIG. 2, in an embodiment, after optionally presenting suggestions, in an embodiment, method 200 may progress from step 212 back to step 202 at which point one or more additional change messages are received by the server computer 110 and another cycle of key sentence identification (and optionally presenting suggestions) may continue. In another embodiment, method 200 may progress from step 212 to step 214 at which point server computer 110 optionally causes the implementation of one or more suggestions associated with one or more of the key sentences responsive to user input. For example, in an embodiment, method 200 may proceed to step 224 at which point server computer 110 transmits control instructions to application extension 126 that are formatted to cause modifying content of the digital document undergoing composition at the client computing device 120 based on user input. Such embodiments may involve transmitting control or display instructions to client computing device 120 formatted to cause displaying, in the graphical user interface, an interface element that is associated with at least one of the suggestion text strings presented in the checklist. In an embodiment, the interface element is configured to automatically modify the content of the digital document to reflect the at least one of the suggestion text strings in response to input from the client computer specifying selecting the interface element via a control device.

FIG. 4A and FIG. 4D depict an example interface element 428 configured to automatically modify the content of the digital document to reflect the at least one of the suggestion text strings in response to input from the client computer specifying selecting the interface element via a control device. In an embodiment, responsive to programmatically receiving an indication from the client computing device 120 of interface element 428 being selected, server computer 110 might cause, for example, in the digital document under composition an identified key sentence to be (1) bolded, (2) moved near to a first sentence of the sequence of sentences, (3) or placed in a new or shorter paragraph or earlier in a current paragraph. In other embodiments, a different particular interface element of panel 416 is configured for selection by a user to cause an automatic implementation of suggestions.

Referring again to FIG. 2, in an embodiment, after optionally implementing suggestions, in an embodiment, method 200 may progress from step 214 back to step 202 at which point one or more additional change messages are received by the server computer 110 and another cycle of key sentence identification (and optionally presenting suggestions/optionally implementing suggestions) may continue.

In an embodiment, method 200 involves dividing the representation of the digital document 112 into segments and identifying, in the graphical user interface of the client computing device 120, one or more key sentences for each segment. The segments may be of roughly unequal length or of unequal lengths. For example, the representation of the digital document 112 could be divided into X roughly equal segments, each segment containing no more than Y sentences, and using the methods described herein to identify at least one key sentence in each of the X segments. The other techniques described herein may then apply to each segment of the X segments.

In embodiments, method 200 may be automatically executed in one or more second iterations, each of the second iterations executing responsive to the server computer 110 detecting a triggering event. Example triggering events include the server computer 110 determining that a predetermined period has elapsed after executing a previous iteration of the method, or the server computer 110 determining that the client computing device 120 has transmitted a particular number of words added to the digital document. One of skill in the art would recognize that these are only examples of the triggering events that might be used. In an embodiment, a stored execution schedule in memory 111 governs method execution.

2.4 Example Assistant Process

Figure 3A:
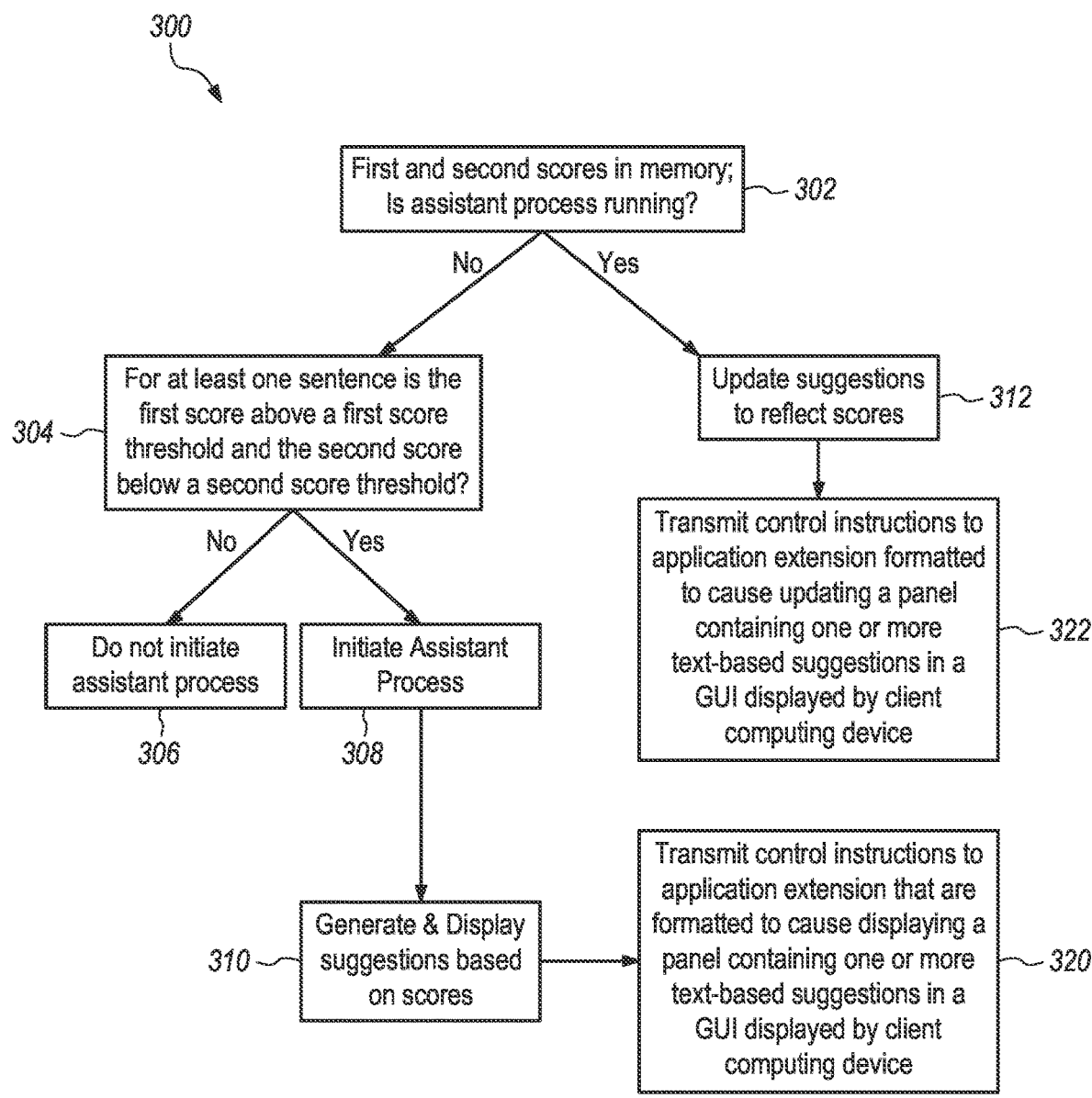
FIG. 3A depicts an example computer-implemented or programmed process flow for facilitating the presentation and/or implementation of suggestions using an assistant process.

In embodiments, an assistant process facilitates the presentation of suggestions at client computing device 120 and/or the programmatic implementation of those suggestions. FIG. 3A depicts an example process flow for facilitating the presentation and/or implementation of suggestions using an assistant process. Process 300 may begin at block 302 when the first scores and second scores are in memory, for example, after steps 206 and 208 of FIG. 2. Process 300 may then programmatically determine if the assistant process is already running in the application extension 126 of the client computing device 120. In an embodiment, if the first and second scores are in memory and the assistant process is already currently running, then process 300 may proceed to step 312 where one or more text-based suggestions are updated to reflect the newly received or calculated first and second scores. This updating may occur, for example, at block 322 by transmitting control instructions to application extension 126, the control instructions formatted to cause updating a panel containing one or more text-based suggestions in a GUI displayed by the client computing device 120. An example visualization of updating suggestions can be seen in FIG. 4D where certain suggestions are crossed out, the crossed out suggestions 432 representing suggestions which are no longer required based on the new set of first scores 117 and the new set of second scores 119 in memory at block 302.

In an embodiment, when the first scores and second scores are in memory at block 302 and the assistant process is not currently running, process 300 may proceed to block 304 where a programmatic determination is made of whether, for at least one sentence of the sequence of sentences, a corresponding first score is above a specific first score threshold and a corresponding second score is below a specific second score threshold. These thresholds might be the same thresholds required for the identification of key sentences in method 200, or they might be other thresholds. Said determination may reflect whether there is semantically important information in the digital document which is unlikely to be read, such that initiating the assistant process to facilitate the presentation and implementation of suggestions at the client computing device 120 is likely to be useful for the user of the client computing device 120.

In an embodiment, when it is determined at block 304 that, for no sentence of the sequence of sentences, is the first score high enough to exceed the specific first score threshold and the second score low enough to fall below the specific second score threshold, then the assistant process may not be initiated at block 306.

On the other hand, in an embodiment, when it is determined at block 304 that, for at least one sentence of the sequence of sentences, the corresponding first score is high enough to exceed the specific first score threshold and the corresponding second score is low enough to fall below the specific second score threshold, then the assistant process may be initiated at block 308. Initiating the assistant process may be accomplished, for example, by server computer 110 transmitting control instructions to the client computing device 120 formatted to initiate the assistant process in the application program 124 or extension 126. Specifically, initiating the assistant process may comprise displaying panel 416 (FIG. 4A and FIG. 4D) alongside a digital document undergoing composition at the client computing device 120.

In an embodiment, process 300 may involve, at block 310, generating and displaying suggestions based on first scores and second scores and/or, at block 320, transmitting control instructions to application extension 126 that are formatted to cause displaying panel 416 containing one or more text-based suggestions in a GUI displayed by the client computing device 120. Panel 416 may be used to identify key sentences and display and implement suggestions as described herein with greater specificity.

Figure 3B:
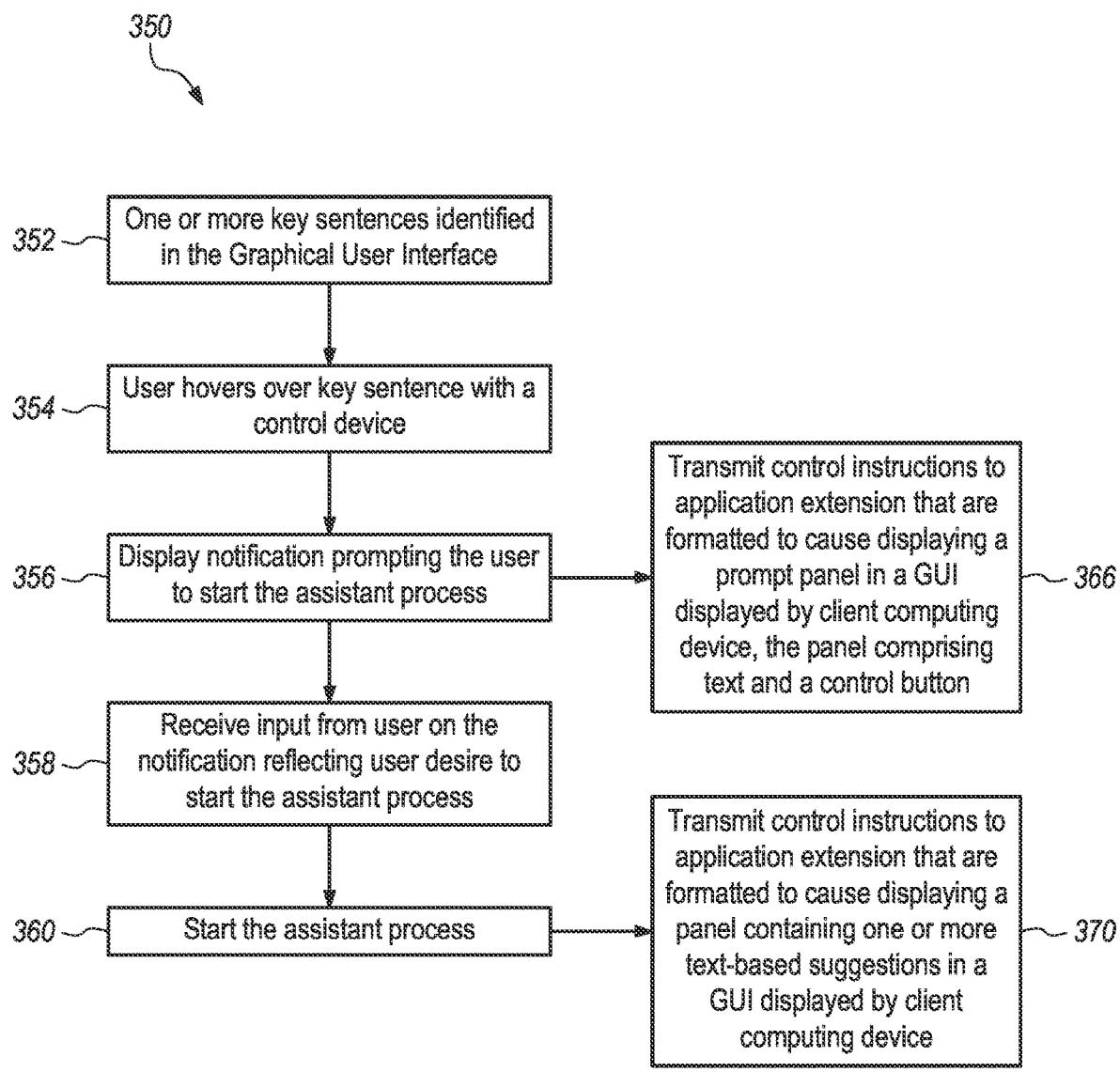
FIG. 3B depicts an example computer-implemented or programmed method for starting an assistant process.

FIG. 3B depicts an example method for starting an assistant process. In an embodiment, method 350 starts at step 352 at which point one or more key sentences are identified in a graphical user interface. This may correspond to, for example, when one or more key sentences may be caused to be identified in a graphical user interface of the client computing device 120 by server computer 110 at step 210 of method 200 (FIG. 2).

Referring again to FIG. 3B, in an embodiment, method 300 may progress from step 352 back to step 354 at which point server computer 110 detects that a cursor of a control device associated with the client computing device 120 is hovering over one of the key sentences identified in the GUI. Specifically, the cursor position of the control device may be detected to be on or proximal to that of a key sentence in the GUI by the application program 124 or the application extension 126 and this may be transmitted to server computer 110.

In an embodiment, method 300 may proceed from step 356 to step 366 at which point server computer 110 transmits control instructions to application extension 126 that are formatted to cause displaying a prompt panel in a GUI displayed by client computing device 120, the panel comprising text and a control button. The text may be a triggered notification text string specifying to initiate assistant instructions that are programmed to facilitate the transmission of additional suggestion text strings to the client computing device.

FIG. 4C depicts an example prompt panel 450 which may be used at step 366, comprising text string 435, control button 430, and dismiss button 440. Text string 435 is the aforementioned text of the triggered notification specifying that a user may select control button 430 to initiate the assistant process. Dismiss button 440 may be used by a user of computing device 120 to dismiss the notification, potentially closing prompt panel 450. In an embodiment, control button 430 may be selected by a user of client computing device 120 to initiate the assistant process.

Referring again to FIG. 3B, in an embodiment, method 300 may proceed from step 356 to step 358 at which point server computer 110 receives input from a user on the notification reflecting a desire to start the assistant process. For example, server computer 110 may receive a notification that a user of client computing device 120 has selected control button 430 (FIG. 4C). In other embodiments, server computer 110 may receive the notification through a different means or of a different event reflecting the user desire.

In an embodiment, method 300 may progress from step 358 to step 360 at which point server computer 110 causes the assistant process to be started, responsive to receiving the input at step 356.

In an embodiment, the assistant process is initiated at step 370 by server computer 110 transmitting control instructions to application extension 126 configured to cause displaying a panel containing one or more text-based suggestions in a GUI displayed by client computing device 120. For example, panel 416 may be displayed (FIGS. 4A & 4D) and suggestions may be generated and displayed as described with more specificity herein.

3.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
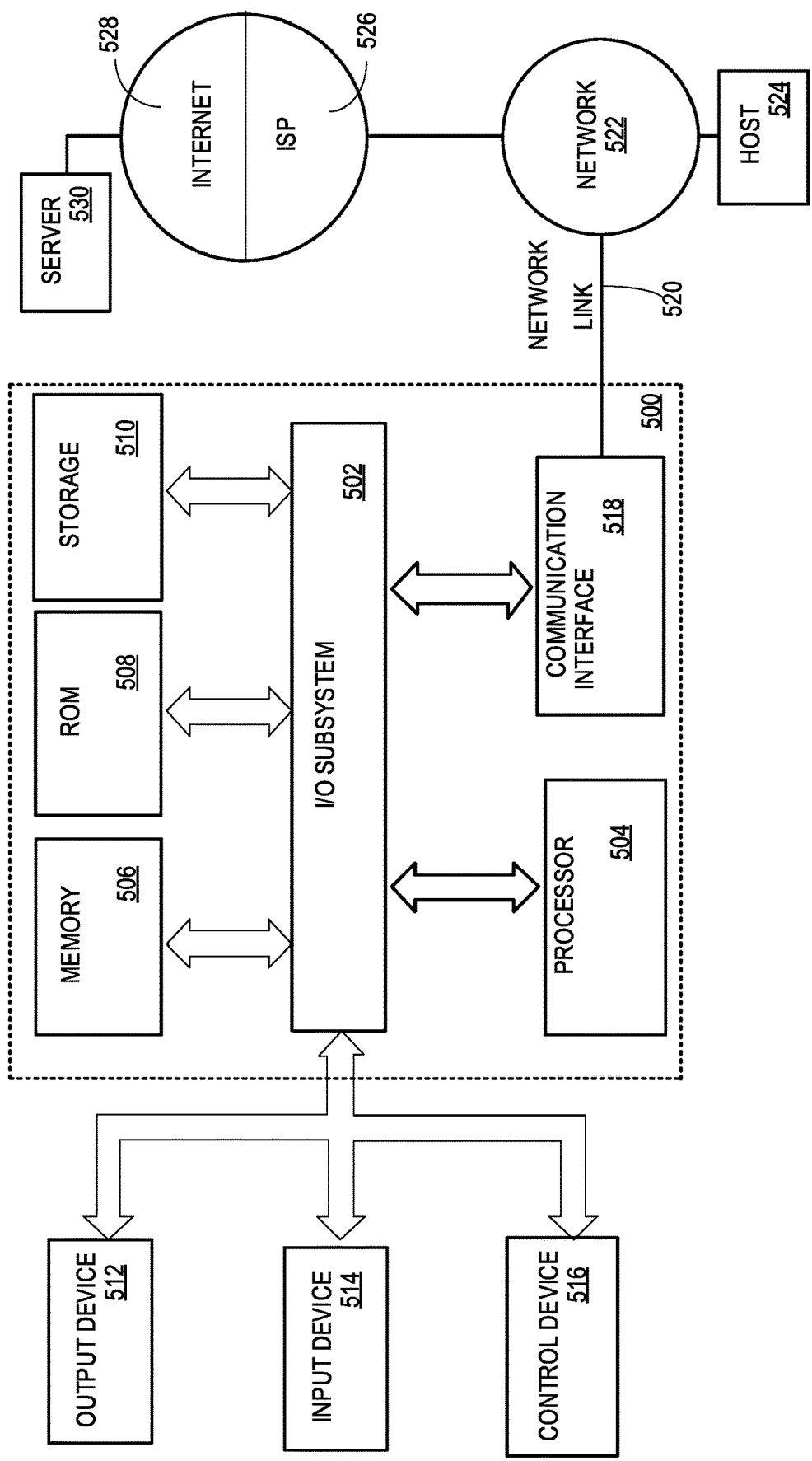
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (for example, private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method, comprising:
receiving a representation of a digital document at a server computer and electronically storing the representation in memory of the server computer, the digital document comprising a sequence of sentences arranged into one or more paragraphs, each sentence comprising one or more words in a natural language;
programmatically generating a document-specific vocabulary by tokenizing a set of all sentences comprising the sequence of sentences into a document-specific set of tokens;
programmatically inferring and outputting, by executing a trained machine learning model to evaluate the document-specific set of tokens, for each sentence of the sequence of sentences, a corresponding first score value representing a probability of that sentence being semantically important to an overall meaning of the digital document;
programmatically determining, by constructing a digital representation of a Knapsack optimization problem in server computer memory and executing solution instructions to solve the problem based on a plurality of heuristics and defined partly by a cost function and a value function, the functions being programmed as part of the solution instructions, for each sentence of the sequence of sentences, a corresponding second score value representing a likelihood of that sentence being read by a future reader of the digital document; and
transmitting, from the server computer to a client computing device via a network, first display instructions that are formatted to cause identifying one or more key sentences of the sequence of sentences based on each of the corresponding first score value and the corresponding second score value of each sentence of the sequence of sentences in a graphical user interface of the client computing device.

2. The method of claim 1, further comprising receiving, from a client computing device that is communicatively coupled to the server computer via a network, a plurality of change messages each comprising a text change to the digital document that is undergoing composition at the client computing device, and forming the representation of the digital document based on the change messages.

3. The method of claim 1, further comprising transmitting to the client computing device second display instructions that are formatted to cause displaying, in the graphical user interface of the client computing device, one or more suggestion text strings that are associated with at least one of the key sentences.

4. The method of claim 3, the second display instructions being formatted to cause displaying the one or more suggestion text strings in the graphical user interface of the client computing device using at least one of an underlining of one or more words of the digital document or a notification in a graphical panel that is displayed separate from the digital document.

5. The method of claim 4, the second display instructions being formatted to cause displaying at least one of the one or more suggestion text strings in a checklist in the graphical panel, the method further comprising transmitting updated second display instructions being formatted to update the checklist in real time in response to input from the client computing device specifying one or more changes to content of the digital document that implement the at least one of the one or more suggestion text strings.

6. The method of claim 5, the second display instructions being formatted to cause displaying the one or more suggestion text strings of the checklist with at least one of a first suggestion text string specifying changing key information to boldface, a second suggestion text string specifying positioning more important information proximal to a first sentence of the sequence of sentences, or a third suggestion text string specifying converting one or more long paragraphs to bulleted lists.

7. The method of claim 6, further comprising formatting the second display instructions to cause displaying, in the graphical user interface, an interface element that is associated with at least one of the suggestion text strings presented in the checklist, the interface element being configured to automatically modify the content of the digital document to reflect the at least one of the one or more suggestion text strings in response to input from the client computer specifying selecting the interface element via a control device.

8. The method of claim 4, further comprising formatting the second display instructions to cause displaying at least one of the one or more suggestion text strings using underlining in the digital document at the client computing device, and the method further comprising formatting the second display instructions to cause displaying a triggered notification text string specifying to initiate assistant instructions that are programmed to facilitate transmission of additional suggestion text strings to the client computing device and transmitting the second display instructions in response to receiving input from the client computing device specifying a control device hovering over a certain sentence of the sequence of sentences that is associated with the underlining.

9. The method of claim 8, further comprising transmitting to the client computing device third display instructions that are formatted to specify initiating the assistant instructions in response to the server computer detecting, for a particular sentence of the sequence of sentences, that the first score value corresponding to the particular sentence is above a first score threshold and that the second score value corresponding to the particular sentence is below a second score threshold.

10. The method of claim 1, further comprising transmitting to the client computing device fourth display instructions that are formatted to cause displaying, in the graphical user interface of the client computing device, a heatmap comprising an overlay of a plurality of levels of highlighting using a color gradient, each sentence of the sequence of sentences being highlighted with a level of highlighting associated with the corresponding second score value of that sentence, and the sentences that have been programmatically determined to be more likely to be read being overlayed with a specified first level of highlighting.

11. The method of claim 1, further comprising dividing the representation of the digital document into segments and transmitting to the client computing device fifth display instructions that are formatted to cause identifying, in the graphical user interface of the client computing device, one or more key sentences for each segment.

12. The method of claim 1, further comprising automatically executing the method in one or more second iterations, each of the second iterations executing responsive to the server computer detecting a triggering event.

13. The method of claim 12, the triggering event comprising the server computer determining that a predetermined period has elapsed after executing a previous iteration of the method, or the server computer determining that the client computing device has transmitted a particular number of words added to the digital document.

14. The method of claim 1, a heuristic associated with the cost function being a first function of a sentence length of a particular sentence of the sequence of sentences, and one or more heuristics associated with the value function being at least one of a second function of the sentence length of the particular sentence, a function of a position of the particular sentence within the sequence of sentences, a function of a complexity of each word of a set of words comprising the particular sentence, and a function of a frequency of each word of the set of words comprising the particular sentence with respect to a set of all words comprising the digital document.

15. The method of claim 1, a set of features of the trained machine learning model comprising at least one of a function of a sentence length of a particular sentence, a function of the particular sentence's position in a corresponding paragraph, a function of the corresponding paragraph's position relative to any other paragraphs of the digital document, a function of a proximity of the particular sentence to a nearest of a first sentence or a last sentence of the sequence of sentences, a function of a position of the particular sentence within the corresponding paragraph, or a LexRank of the particular sentence.

16. A computer system comprising:
one or more processors;
digital electronic memory coupled to the one or more processors and storing one or more sequences of stored program instructions which, when executed by the one or more processors, cause the one or more processors to execute:
receiving a representation of a digital document at a server computer and electronically storing the representation in memory of the server computer, the digital document comprising a sequence of sentences arranged into one or more paragraphs, each sentence comprising one or more words in a natural language;
programmatically generating a document-specific vocabulary by tokenizing a set of all sentences comprising the sequence of sentences into a document-specific set of tokens;
programmatically inferring and outputting, by executing a trained machine learning model to evaluate the document-specific set of tokens, for each sentence of the sequence of sentences, a corresponding first score value representing a probability of that sentence being semantically important to an overall meaning of the digital document;
programmatically determining, by constructing a digital representation of a Knapsack optimization problem in server computer memory and executing solution instructions to solve the problem based on a plurality of heuristics and defined partly by a cost function and a value function, the functions being programmed as part of the solution instructions, for each sentence of the sequence of sentences, a corresponding second score value representing a likelihood of that sentence being read by a future reader of the digital document; and
transmitting, from the server computer to a client computing device via a network, first display instructions that are formatted to cause identifying one or more key sentences of the sequence of sentences based on each of the corresponding first score value and the corresponding second score value of each sentence of the sequence of sentences in a graphical user interface of the client computing device.

17. The system of claim 16, the instructions further executable to cause performance of transmitting to the client computing device second display instructions that are formatted to cause displaying, in the graphical user interface of the client computing device, one or more suggestion text strings that are associated with at least one of the key sentences.

18. The system of claim 17, the second display instructions being formatted to cause displaying the one or more suggestion text strings in the graphical user interface of the client computing device using at least one of an underlining of one or more words of the digital document or a notification in a graphical panel that is displayed separate from the digital document.

19. The system of claim 18, the second display instructions being formatted to cause displaying at least one of the one or more suggestion text strings in a checklist in the graphical panel, the method further comprising transmitting updated second display instructions being formatted to update the checklist in real time in response to input from the client computing device specifying one or more changes to content of the digital document that implement the at least one of the one or more suggestion text strings.

20. The system of claim 19, the second display instructions being formatted to cause displaying, in the graphical user interface, an interface element that is associated with at least one of the suggestion text strings presented in the checklist, the interface element being configured to automatically modify the content of the digital document to reflect the at least one of the suggestion text strings in response to input from the client computer specifying selecting the interface element via a control device.

* * * * *